United States Patent [19]

Uemura et al.

[11] Patent Number: 4,949,984
[45] Date of Patent: Aug. 21, 1990

[54] REAR-WHEEL STEERING APPARATUS FOR VEHICLE

[75] Inventors: Hiroki Uemura; Katsuhiro Tokumaru; Ayumu Doi, all of Hiroshima, Japan

[73] Assignee: Mazda Motor Corporation, Hiroshima, Japan

[21] Appl. No.: 383,091

[22] Filed: Jul. 21, 1989

[30] Foreign Application Priority Data

Jul. 25, 1988 [JP] Japan ................. 63-183583
Mar. 1, 1989 [JP] Japan ................. 1-49121

[51] Int. Cl.⁵ ............................. B72D 7/00
[52] U.S. Cl. ........................... 280/91; 180/140
[58] Field of Search ................. 280/91; 180/140

[56] References Cited

U.S. PATENT DOCUMENTS

| | | | |
|---|---|---|---|
| 4,295,657 | 10/1981 | Sano et al. | 280/91 |
| 4,558,877 | 12/1985 | Furukawa et al. | 280/91 |
| 4,813,694 | 3/1989 | Boberg et al. | 280/91 |
| 4,826,188 | 5/1989 | Boberg et al. | 280/91 |

FOREIGN PATENT DOCUMENTS

| | | |
|---|---|---|
| 38-97468 | 4/1963 | Japan . |
| 38-97469 | 4/1963 | Japan . |
| 62-71090 | 5/1987 | Japan . |

*Primary Examiner*—Kenneth R. Rice
*Attorney, Agent, or Firm*—Staas & Halsey

[57] ABSTRACT

A rear-wheel steering apparatus for a vehicle includes an output shaft for coupling rear right and left wheels through one shaft, a cam member which is rotatable about an axis extending in a direction perpendicular to the output shaft, a pair of roller members which are provided to the output shaft and are in rolling contact with opposing portions of the outer peripheral surface of the cam member, and an input shaft for rotating the cam member in accordance with a turning amount of front wheels.

21 Claims, 16 Drawing Sheets

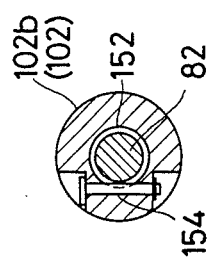
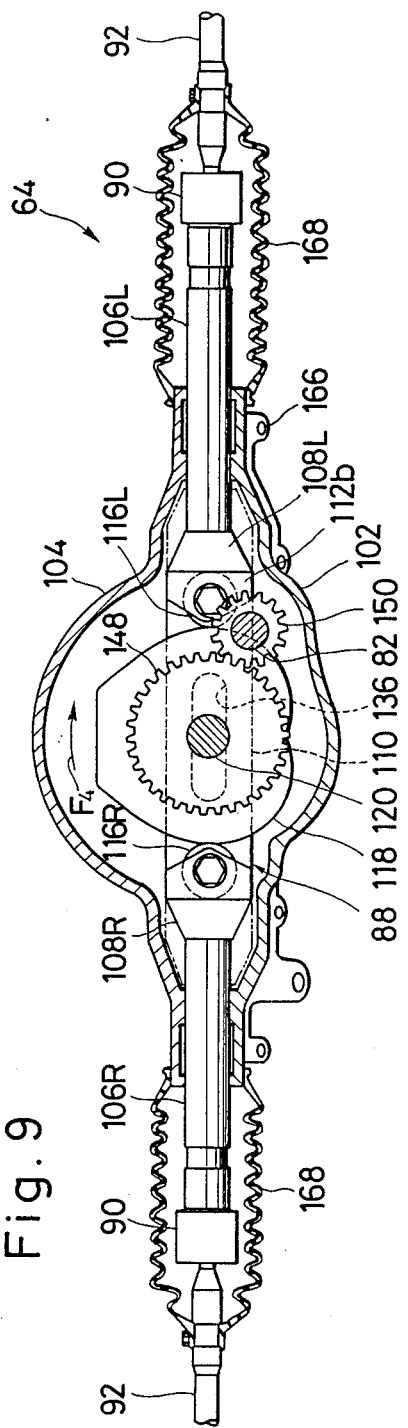

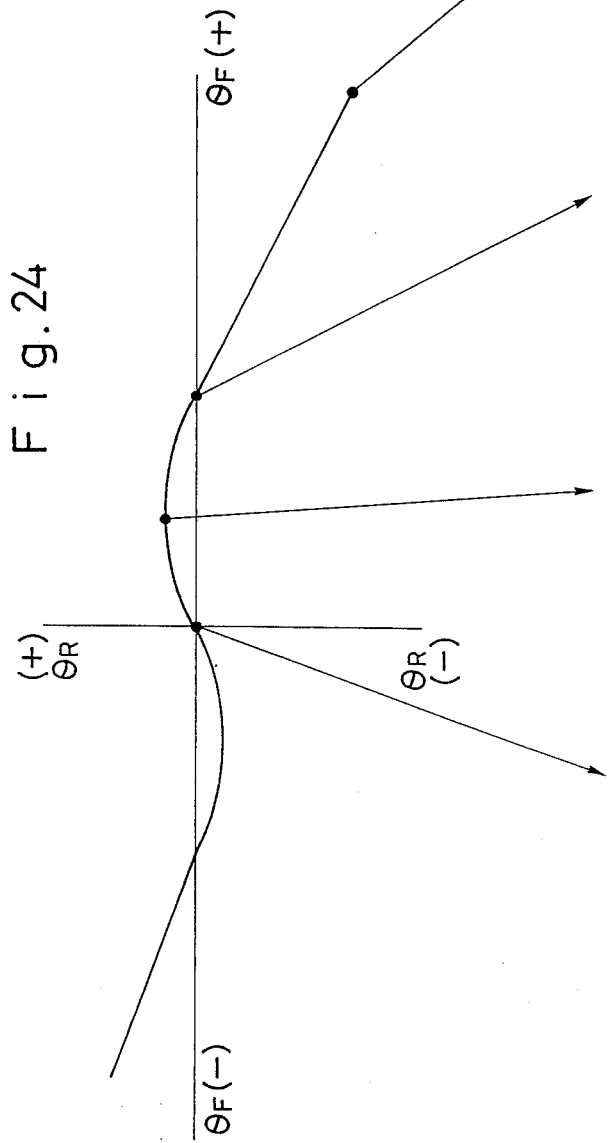

REAR-WHEEL STEERING APPARATUS FOR VEHICLE

BACKGROUND OF THE INVENTION

The present invention relates to a rear-wheel steering apparatus for a vehicle for turning rear wheels upon a turning operation of front wheels, for example, a rear-wheel steering apparatus for turning rear wheels in a phase opposite to that of front wheels when the front wheels are turned at a large turning angle.

As a rear-wheel steering apparatus for a vehicle, two mechanisms, i.e., turning angle sensitive type and vehicle speed sensitive type mechanisms are employed. In the former mechanism, when front wheels are turned at a small turning angle, the rear wheels are turned to be in-phase with the front wheels. When the front wheels are turned at a large turning angle, the rear wheels are turned in a phase opposite to that of the front wheels. In the latter mechanism, the front and rear wheels are turned in opposite phases at a low vehicle speed, and are turned to be in-phase with each other at a high vehicle speed.

As a conventional turning angle sensitive four-wheel steering apparatus, a technique disclosed in U.S. Pat. No. 4,295,657 is known. The four-wheel steering apparatus disclosed in this prior art comprises a cam plate which is displaced along the back-and-forth direction. A substantially S-shaped cam groove is formed in this cam plate. A pin fixed to a rod for turning the rear wheels is slidably engaged with the cam groove. In this manner, the rear wheels can be turned to the right or left.

However, in the four-wheel steering apparatus disclosed in U.S. Pat. No. 4,295,657, a large force acts on a pin engaged with the cam groove, and as a result, a sliding resistance is increased, thus making smooth control difficult. In addition, the mechanical strength of the pin is decreased, resulting in poor reliability and durability. Upon engagement between the pin and the cam groove, a gap (clearance) is inevitably formed between the pin and the cam groove. As a result, backlash occurs between the pin and the cam groove, and this leads to degraded control precision.

As still another prior art of the turning angle sensitive four-wheel steering apparatus, one disclosed in Japanese Utility Model Laid-Open (Kokai) No. 62-71080 is known. In the four-wheel steering apparatus disclosed in this utility model, an arcuated cam groove is formed in a side surface of a rotating cam plate. A pin fixed to a rod for turning the rear wheels is slidably engaged with the cam groove. In this manner, the rear wheels can be turned to the left or right.

However, the four-wheel steering apparatus disclosed in Japanese Utility Model Laid-Open (Kokai) No. 62-71080 mainly comprises a cam groove and a pin engaged therewith, and has problems similar to those of the conventional four-wheel steering apparatus disclosed in U.S. Pat. No. 4,295,657.

As a turning angle sensitive four-wheel steering apparatus which does not employ an arrangement comprising a cam groove and a pin engaged therewith, techniques disclosed in Japanese Patent Laid-Open (Kokai) Nos. 63-97468 and 63-97469 are known. In these prior arts, a spherical bushing (15) is urged against an outer peripheral surface of a rotating cam plate, and is provided to a follower lever (10), one end of which is pivotally supported. A rear-wheel tie rod (13) is coupled to the follower lever, and upon left or right swinging movement of the follower lever, the rear wheels are turned to the left or right.

However, in the conventional arrangement, a space for swinging the follower lever must be kept, and the apparatus may become bulky. On the follower lever, the position of the spherical bushing and the coupling position of the tie rod are separated in the back-and-forth direction. As a result, a bending moment acts on the lever, and the mechanical strength of the lever must be increased to cope with it. As a result, the lever is increased in size, and its weight is also increased.

SUMMARY OF THE INVENTION

The present invention has been made in consideration of the above problems, and has as its object to provide a rear-wheel steering apparatus for a vehicle, which can realize a high-precision rear-wheel steering operation with a simple arrangement.

It is another object of the present invention to provide a rear-wheel steering apparatus for a vehicle with high reliability and durability without adopting an arrangement comprising a cam groove and a pin engaged therewith.

It is still another object of the present invention to provide a rear-wheel steering apparatus for a vehicle, which can attain high control precision free from backlash without adopting an arrangement comprising a cam groove and a pin engaged therewith.

It is still another object of the present invention to provide a rear-wheel steering apparatus for a vehicle, which can realize a compact apparatus as a whole.

It is still another object of the present invention to provide a turning angle sensitive cam type rear-wheel steering apparatus which has a simple structure and high durability, and is free from an alignment error.

To achieve the above objects, a rear-wheel steering apparatus for a vehicle according to one aspect of the present invention comprises: a pair of tie rods, respectively connected to a pair of rear wheels, for turning the corresponding rear wheels in a right-and-left direction of the vehicle; and rear-wheel steering means, connected to the tie rods, for displacing the corresponding tie rods in the right-and-left direction of the vehicle, the improvement in which the rear-wheel steering means includes: a casing; an output shaft both ends of which are respectively connected to the pair of tie rods and supported on the casing to be displaceable in the right-and-left direction of the vehicle; a cam member which is supported to be rotatable about an axis extending to be perpendicular to an axial direction of the output shaft and on an outer peripheral surface of which a cam profile is formed; a pair of roller members which are provided to the output shaft, disposed at two sides of the cam member to sandwich the cam member therebetween, and in rolling contact with opposing portions of the outer peripheral surface of the cam member; and an input shaft for rotating the cam member.

BRIEF DESCRIPTION OF THE DRAWINGS

FIGS. 1 to 4 show a first embodiment of a rear-wheel steering apparatus according to the present invention, in which:

FIG. 1 is a schematic top view of an arrangement of a four-wheel steering apparatus which adopts the rear-wheel steering apparatus of the first embodiment;

FIG. 2 is a top view showing an arrangement of the rear-wheel steering apparatus shown in FIG. 1 with a housing being cut away and some internal arrangements;

FIG. 3 is a front view showing the rear-wheel steering apparatus shown in FIG. 2 with the housing being cut away; and FIG. 4 is a graph showing a turning characteristic of rear wheels turned by the rear-wheel steering apparatus of the first embodiment, FIGS. 5 to 19 show a second embodiment of a rear-wheel steering apparatus according to the present invention, in which:

FIG. 5 is a schematic top view of an arrangement of a four-wheel steering apparatus which adopts the rear-wheel steering apparatus of the second embodiment;

FIG. 6 is a rear view of a mounting state of the rear-wheel steering apparatus shown in FIG. 5 to rear wheels;

FIG. 7 is a perspective view showing the rear-wheel steering apparatus shown in FIG. 6;

FIGS. 8 and 9 are respectively a cross-sectional view and a longitudinal sectional view showing cutaway states of the arrangement of the rear-wheel steering apparatus shown in FIG. 7;

FIG. 10 is a longitudinal sectional view showing a mounting state of an input shaft to a lower housing;

FIG. 11 is a partially cutaway sectional view of a mounting state of a roller;

FIG. 12 is a sectional view showing an arrangement of a bushing;

FIG. 13 is a top view showing an arrangement of a housing;

FIG. 14 is a front view showing a shape of a cam member and a rolling contact state between the cam member and a pair of rollers;

FIG. 15 is a graph showing a turning characteristic of the rear wheels according to the second embodiment;

FIGS. 16 to 18 are front views showing assembling steps of mounting the cam member to an output shaft; and FIG. 19 is a top view showing a longitudinal groove formed in a support shaft;

FIGS. 22 to 24 show a fourth embodiment of a rear-wheel steering apparatus according to the present invention, in which:

FIG. 22 is a front view showing a shape of a cam member used in the rear-wheel steering apparatus of the fourth embodiment;

FIGS. 23A to 23D are front views showing in turn changes in rolling contact state between the rollers and cam members shown in FIG. 22; and FIG. 24 is a graph showing a turning characteristic of the rear wheels according to the fourth embodiment.

DETAILED DESCRIPTION OF THE PREFERRED EMBODIMENTS

Various embodiments of a rear-wheel steering apparatus for a vehicle according to the present invention will be described in detail hereinafter with reference to the accompanying drawings.

These embodiments relate to a rear-wheel steering apparatus in a four-wheel steering apparatus suitable for a passenger vehicle, a microbus, a bus, a small truck, a truck, and the like. In the embodiment to be described below, the present invention is applied to a turning angle sensitive rear-wheel steering apparatus for a vehicle.

An arrangement of a first embodiment of a rear-wheel steering apparatus according to the present invention will now be described with reference to FIGS. 1 to 4.

Figure 1:
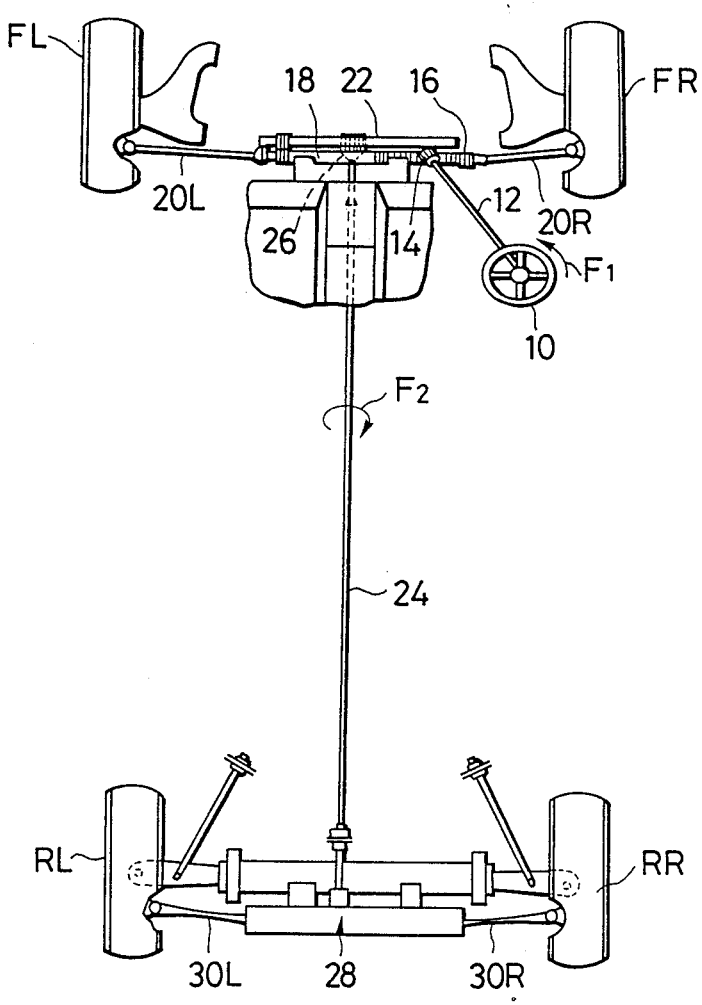

As shown in FIG. 1, in a vehicle, a steering operation of a steering wheel 10 pivots a pinion 14 mounted on the distal end of a steering shaft 12. The pivotal movement of the pinion 14 moves a steering rod 18 integrally mounted with a main rack 16 meshed with the pinion 14 in its axial direction (lateral direction of a vehicle body). Thus, front left and right wheels FL and FR are turned through left and right tie rods 20L and 20R connected to two ends of the steering rod 18.

A sub rack 22 is integrally mounted on the steering rod 18 to be parallel to the main rack 16. The sub rack 22 is meshed with the lower surface of a pinion 26 arranged at the distal end of an intermediate shaft 24. The intermediate shaft 24 extends along the back-and-forth direction of the vehicle body. The rear end of the intermediate shaft 24 is coupled to a rear-wheel steering apparatus 28 as the characteristic feature of the present invention.

The axial movement of the steering rod 18 based on the steering operation of the steering wheel 10 similarly moves the sub rack 22. Upon movement of the sub rack 22, the intermediate shaft 24 is pivoted through the pinion 26. The pivotal movement of the intermediate shaft 24 causes the rear-wheel steering apparatus to turn rear left and right wheels RL and RR through left and right tie rods 30L and 30R.

Although not shown, the steering force of the steering wheel 10 is power-assisted through a hydraulic power-steering mechanism.

Figure 2:
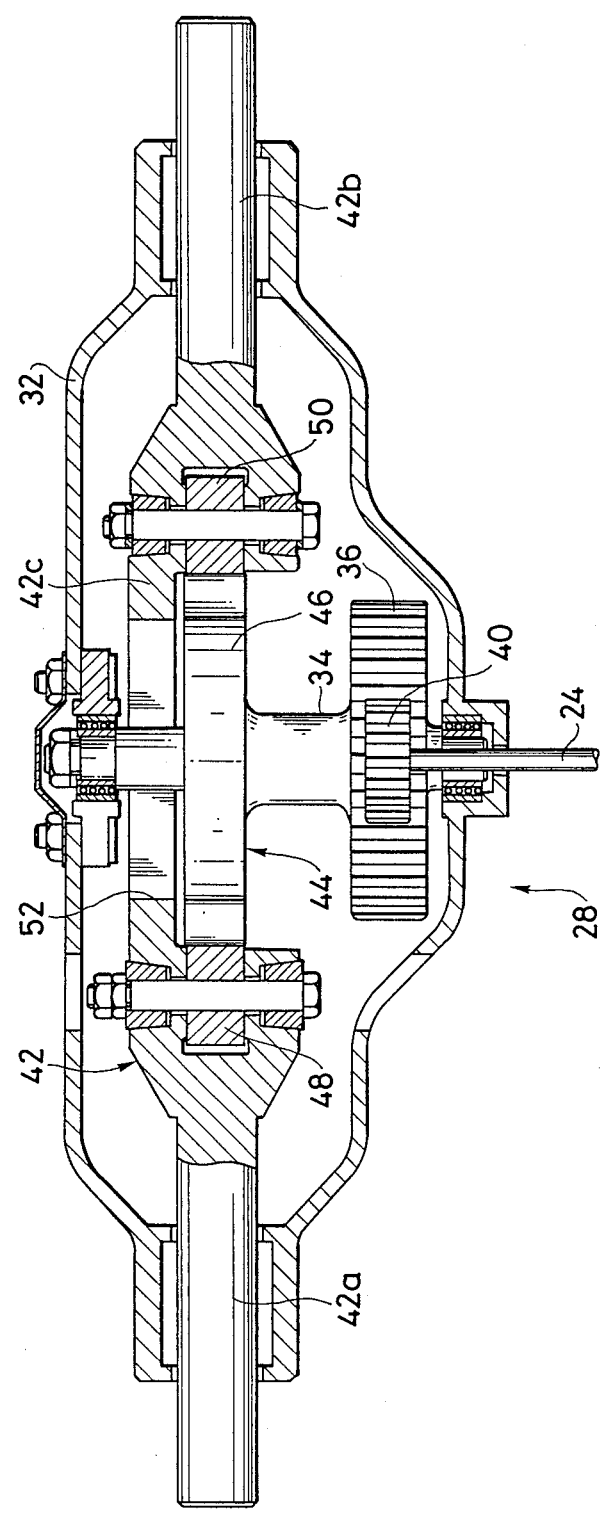

The detailed arrangement of the rear-wheel steering apparatus of the first embodiment will now be described with reference to FIGS. 2 and 3.

The rear-wheel steering apparatus 28 comprises a hollow housing extending along the widthwise direction of the vehicle body. A driven shaft 34 is pivotally supported in the housing 32 to be rotatable about a horizontal axis extending along the back-and-forth direction of the vehicle body. A large-diameter driven gear 36 is coaxially fixed to a portion of the driven shaft 34 on the front side of the vehicle body.

A driving shaft 38 parallel to the driven gear 36 is axially and rotatably supported in the housing 32. A small-diameter driving gear 40 meshed with the driven gear 36 at its upper portion is coaxially fixed to the driving shaft 38. The rear end of the intermediate shaft 24 described above is coaxially connected to the driving shaft 38. Upon rotation of the intermediate shaft 24, the driving shaft 38 is rotated.

A cam member 44 for converting the steering force of the steering wheel 10 into a driving force for moving an output shaft 42 (to be described later) is fixed to a portion of the driven shaft 34 on the rear side of the vehicle body. The outer peripheral surface of the cam member 44 is defined as a cam surface 46, as shown in FIG. 3, and is symmetrically formed about a vertical axis.

The cam surface 46 consists of first cam surface portions 46a each constituted by a circular surface having a radius R having the driven shaft 34 as the center, second cam surface portions 46b each of which is formed such that a distance from the driven shaft 34 is increased from the radius R (i.e., the periphery of the cam surface protrudes) from the upper end of the first cam surface portion 46a toward the top, and third cam surface portions 46c each of which is formed such that a distance from the driven shaft 34 is decreased (i.e., the periphery of the cam surface subsides) from the radius R from the lower end of the first cam surface portion 46a toward the bottom by a value corresponding to an increase in distance in the second cam surface portion 46b.

Each first cam surface portion 46a is provided in correspondence with an angle according to a range wherein the steering wheel 10 is steered counterclockwise or clockwise by about 200° from the neutral position (i.e., a range corresponding a total of 400°). When the steering wheel 10 is at a neutral position (i.e., in a straight travel state), rollers 48 and 50 are in rolling contact with the central portions of the first cam surface portions 46a.

The upper end portions of the right and left second cam surface portions 46b are connected at a top portion when the steering wheel 10 is at a neutral position. The lower end portions of the right and left third cam surface portions 46c are connected at a bottom portion when the steering wheel 10 is at a neutral position.

In other words, in the first embodiment, a diameter of the cam member 44 passing through the driven shaft 34 (i.e., a distance between portions P and Q of the cam surface 46 which are in rolling contact with a pair of rolling contact rollers 48 and 50 (to be described later)) is set to be "2R".

The output shaft 42 is disposed in the housing 32 in the form of a single rod extending along the widthwise direction of a vehicle body, and is movable in the widthwise direction. The two ends of the output shaft 42 project outwardly from the housing 32, and are coupled to the left and right tie rods 30L and 30R.

The output shaft 42 extends along an axis passing through the cam member 44. More specifically, the output shaft 42 is integrally constituted by two end portions 42a and 42b matching with this axis and projecting outwardly from the housing 32 and connected to the tie rods 30L and 30R, and a connecting portion 42c which connects inner ends of the two end portions 42a and 42b and which offsets sideway (backward of the vehicle body) from the above-mentioned axis and is juxtaposed with the cam member 44.

The rolling contact rollers 48 and 50 are axially supported on the inner ends of the two end portions 42a and 42b, i.e., coupled portions to the connecting portion 42c to be pivotal about a rotating axis parallel to the rotating axis of the driven shaft 34. As described above, the distance between the portions P and Q with which these rollers 48 and 50 are in rolling contact is set to be a value (2R) twice the distance R from the rotating axis (central axis of the driven shaft 34) of the first cam surface portion 46a.

An elongated hole 52 through which a portion of the driven shaft 34 on the rear side of the vehicle body is inserted is formed in the connecting portion 42c to extend along the widthwise direction. The height of the elongated hole 52 is set to be slightly larger than the diameter of the inserted portion of the driven shaft 34. Upon rotation of the driven shaft 34 in a state wherein it is inserted in the elongated hole 52, the cam member 44 is rotated and the rolling contact positions of the rolling contact rollers 48 and 50 on the cam surface 46 are changed. In this case, the output shaft 42 is regulated to be moved along the widthwise direction.

In the rear-wheel steering apparatus 28 with the above arrangement, the turning operation of the rear wheels will be described in detail below with reference to the turning characteristic of the rear wheels shown in FIG. 4.

Figure 3:
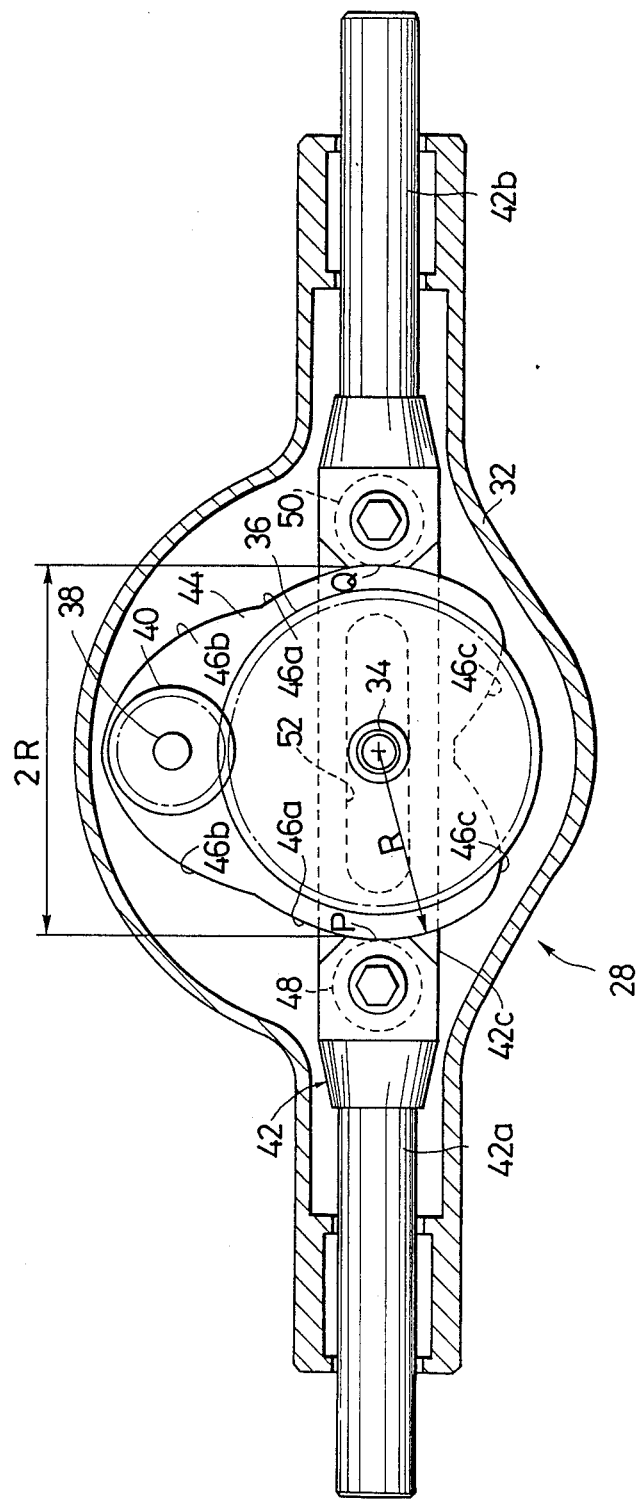

Since the steering wheel 10 is held at a neutral position during straight travel of the vehicle, the rolling contact rollers 48 and 50 are regulated to be in rolling contact with the first cam surface portions 46a of the cam surface 46, as shown in FIG. 3. As a result, the rear wheels RL and RR are held in a neutral position, thus assuring a straight travel property of the vehicle.

In the neutral state of the rear wheels RL and RR, if a lateral force, e.g., lateral wind acts on the rear wheel RL or RR, the output shaft 42 coupling the rear wheels RL and RR is constituted by a single rod, and the cam member 44 for moving the output shaft 42 is included in the output shaft 42 while its two ends along the extending axis of the output shaft 42 are in rolling contact with the rolling contact rollers 48 and 50. As a result, if the lateral force acts from either side, the rear wheels RL and RR can be prevented from becoming unstable, and a good travel state can be attained.

When the steering wheel 10 is steered counterclockwise to change a travel direction to the left from a state wherein the steering wheel 10, i.e., the cam member 44 is at the neutral position, the steering rod 18 is slid to the right in FIG. 1 in accordance with the steering operation of the steering wheel 10, and the front wheels FL and FR are pivoted clockwise. In this manner, the vehicle turns its travel direction to the left.

In the following description, a case will be described wherein the steering wheel 10 is steered counterclockwise. However, when the steering wheel 10 is steered clockwise to make a right turn, an operation is performed in a manner opposite to the counterclockwise steering operation, and a detailed description thereof will be omitted.

When the steering wheel 10 is steered within a range of about 200° from the neutral position, the intermediate shaft 24 is pivoted clockwise when viewed from the rear portion in FIG. 1. As a result, the cam member 44 is pivoted clockwise in FIG. 3, so that the rolling contact position of the left rolling contact roller 48 is changed toward the third cam surface portion 46c, and the rolling contact position of the right rolling contact roller 50 is changed toward the second cam surface portion 46b. However, within this turning range, the rolling contact rollers 48 and 50 are kept in rolling contact with the first cam surface portions 46a of the cam surface 46, and the turning amount of the rear wheels RL and RR is zero. Therefore, the rear wheels RL and RR are not turned, i.e., the neutral state is maintained.

Figure 4:
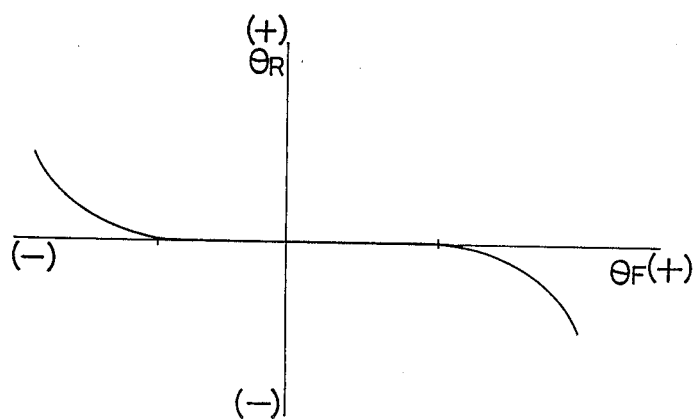

As shown in the turning characteristic graph in FIG. 4, when the front wheels FR and FL are turned within a range of about 15° or less corresponding to the steering angle of about 200° of the steering wheel 10, the rear wheels RL and RR are not turned at all.

When the steering angle of the steering wheel 10 exceeds about 200°, i.e., the front wheels FL and FR are turned at a turning angle of about 15°, the rolling contact position of the left rolling contact roller 48 on the cam surface 46 is shifted from the first cam surface portion 46a to the third cam surface portion 46c, and that of the right rolling contact roller 50 is shifted from the first cam surface portion 46a to the second cam surface portion 46b.

When the steering angle of the steering wheel 10 exceeds about 200°, the cam member 44 is further pivoted clockwise while the left rolling contact roller 48 is in rolling contact with the third cam surface portion 46c, and the right rolling contact roller 50 is in rolling contact with the second cam surface portion 46b. As a result, the right rolling contact roller 50 is displaced to the right in FIG. 3 as the second cam surface portion 46b protrudes. At the same time, the left rolling contact roller 48 is displaced to the right by the same amount as the displacement of the right roller 50 as the third cam surface portion 46c subsides.

In this manner, the output shaft 42 is moved as a whole to the right in FIG. 3, i.e., to the left in FIG. 1 while the distance between the rolling contact points P and Q between the rollers 48 and 50 and the cam surface 46 is maintained to be the above-mentioned distance "2R". Therefore, the rear wheels RL and RR coupled to the two ends of the output shaft 42 through the left and right tie rods 30L and 30R are pivoted clockwise in FIG. 1 in a manner opposite to the front wheels FL and FR. More specifically, when the steering wheel 10 is steered within a range exceeding about 200°, the rear wheels RL and RR are turned in a phase opposite to that of the front wheels FL and FR.

When a driver steers the steering wheel 10 at a large steering angle, i.e., about 200° or more to cause a vehicle to make a quick turn, the rear wheels RL and RR are turned in a phase opposite to that of the front wheels FL and FR, thus assuring a quick turn property of the vehicle.

During turning, the output shaft 42 for defining the turning amount of the rear wheels RL and RR is kept in rolling contact with the rolling contact rollers 48 and 50. For this reason, if lateral wind acts on the rear wheel RL or RR, the rear wheels RL and RR can be prevented from becoming unstable, and travel stability during turning can be guaranteed.

When the steering wheel 10 is further steered from the steering angle of about 200°, the protruding amount of the second cam surface portion 46b and the subsiding amount of the third cam surface portion 46c are gradually increased. As a result, the turning amount of the rear wheels RL and RR to the opposite phase is gradually increased in accordance with the turning angle of the steering wheel 10 exceeding about 200°. As a result, a quick turn property is enhanced.

As described above, in the rear-wheel steering apparatus 28 of the first embodiment, the output shaft 42 defining the turning amount of the rear wheels RL and RR is kept in rolling contact with the rolling contact rollers 48 and 50 for defining the slide amount of the output shaft 42. As a result, the rear wheels RL and RR can maintain good travel stability without becoming unstable.

In the first embodiment, the slide amount of the output shaft 42 is changed upon pivotal movement of the cam member 44 which is in rolling contact with the output shaft 42 through the rolling contact rollers 48 and 50. As a result, the turning amount of the rear wheels RL and RR is defined precisely and reliably, in other words, with improved control precision by a simple arrangement.

In the first embodiment, the lateral force acting on the rear wheel RL or RR is received at the cam surface 46 of the cam member 44 located coaxially with the output shaft 42, and the drive force for turning the rear wheels RL and RR is input to the cam member 44 through the meshing position between the driving gear 40 and the driven gear 36, which is set at a position different from that of the extending axis of the output shaft 42. As a result, the lateral force acting on the rear wheel RL or RR does not directly act on the driving gear 40, and the mechanical strength of these mechanism portions need not be increased. Thus, the entire arrangement can be made compact and can be light in weight.

In the first embodiment, the neutral position of the rear wheels RL and RR is defined by only the pivot position of the cam member 44 without using an elastic restoration force of, e.g., a return spring or the like. As a result, a steering force of the steering wheel 10 when it is turned at about 200° or more need not overcome the elastic restoration force of this return spring, and can be a small force, thus improving operability. When a steering force is power-assisted using a hydraulic power steering mechanism, the assisting power of the power steering mechanism can be small. As a result, the arrangement of the power steering mechanism can be simplified and an engine load for driving it can be decreased.

The present invention is not limited to the arrangement of the first embodiment, and various changes and modifications may be made within the spirit and scope of the invention.

For example, in the first embodiment, the elongated hole 52 is formed in the connecting portion 42c of the output shaft 42, and the driven shaft 34 is inserted through the elongated hole 52. However, the present invention is not limited to this. The connecting portion 42c may be formed such that its upper or lower portion is curved or is formed in a crank shape to escape from the driven shaft 34.

Second to fourth embodiments of a rear-wheel steering apparatus for a vehicle according to the present invention will be described in detail hereinafter.

A second embodiment of a rear-wheel steering apparatus for a vehicle according to the present invention will now be described with reference to FIGS. 5 to 19.

Figure 5:
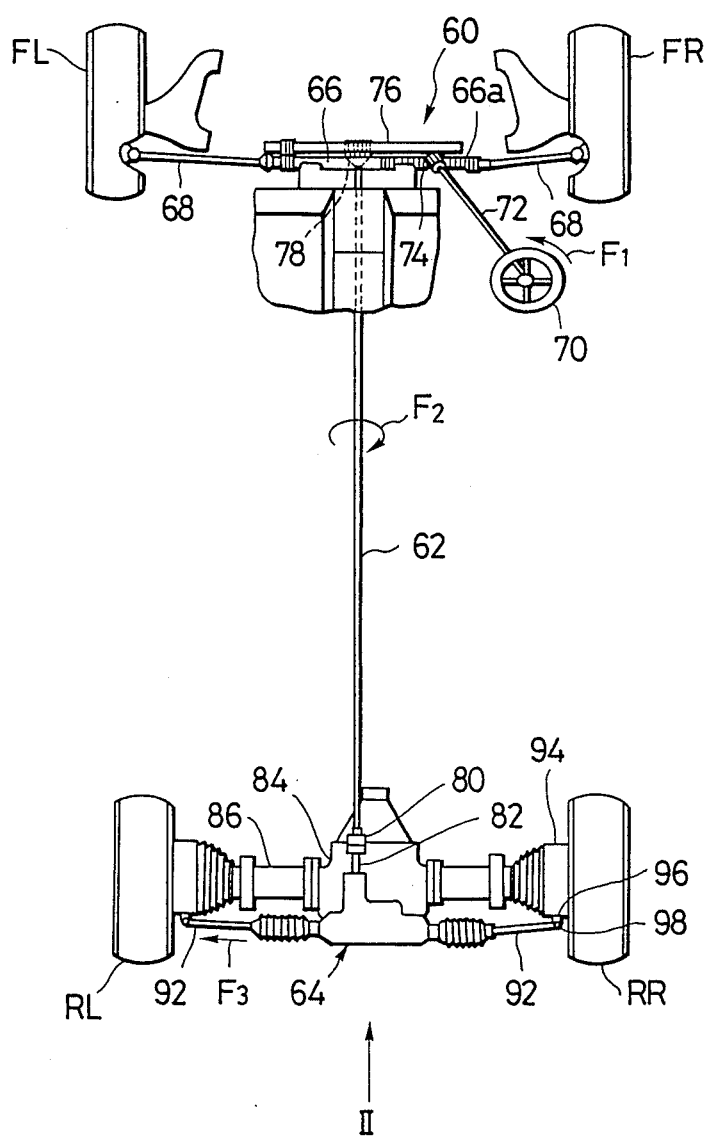
Figure 6:
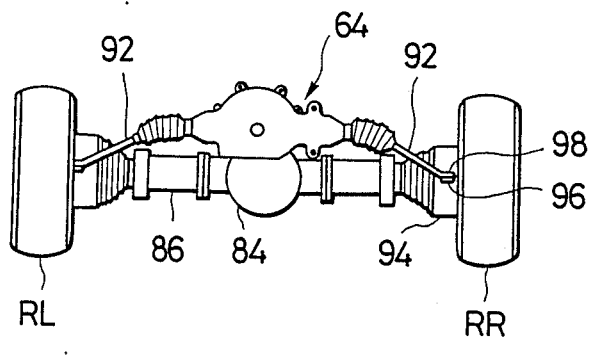
Figure 7:
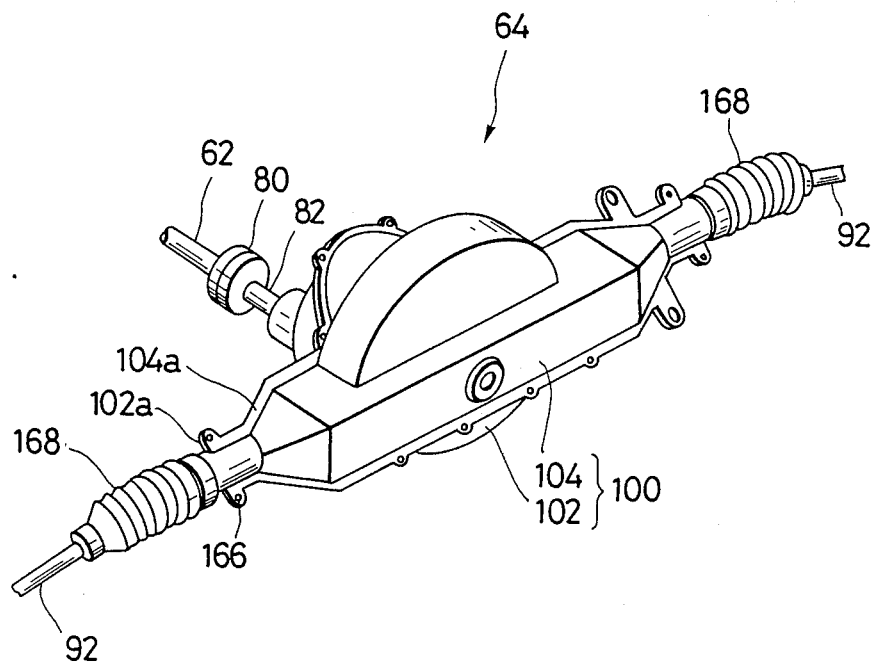

In the second embodiment, as shown in FIGS. 5 and 6, a four-wheel steering apparatus for a vehicle comprises a front-wheel steering apparatus 60 for turning left and right front wheels FL and FR and a rear-wheel steering apparatus 64, interlocked with and coupled to the front-wheel steering apparatus 60 through an intermediate shaft 62, for turning rear left and right wheels RL and RR.

The front-wheel steering apparatus 60 will be described first. The pair of front wheels FL and FR are coupled to each other through a steering rod 66 extending in the widthwise direction of a vehicle body and a pair of tie rods 68 coupled to the two ends of the steering rod 66. A pinion 74 is coupled to the lower end of a steering shaft 72 extending from a steering wheel 70. The pinion 74 is meshed with a main rack 66a formed on the steering rod 66. Therefore, when the steering wheel 70 is pivoted counterclockwise, as indicated by an arrow $F_1$ in FIG. 5, the steering rod 66 is moved to the right through the pinion 74, and the front left and right wheels FL and FR are pivoted counterclockwise about a king pin (not shown) to be turned in a left turn direction. Contrary to this, when the steering wheel 70 is pivoted clockwise, the front left and right wheels FL and FR are pivoted clockwise and are turned in a right turn direction. Although not shown, the steering force of the steering wheel 70 is power-assisted by a known hydraulic power steering mechanism.

The rear-wheel steering apparatus 64 will be described below.

A sub rack member 76 extending in the widthwise direction is fixed to the steering rod 66, and a sub rack is formed on the lower surface of the sub rack member 76. The intermediate shaft 62 extends from the sub rack member 76 toward the rear-wheel steering apparatus 64. A pinion 78 is mounted on the front end of the intermediate shaft 62. The pinion 78 is meshed with the sub rack on the lower surface of the sub rack member 76. The rear end portion of the intermediate shaft 62 is coupled to an input shaft 82 of the rear-wheel steering apparatus 64 through a coupling 80. Therefore, when the steering wheel 70 is operated in the direction of the arrow $F_1$, the intermediate shaft 62 is pivoted clockwise when viewed from the rear portion, as indicated by an arrow $F_2$, and the rotational angle of the intermediate shaft 62 is set in proportion to the turning angle of the front wheels FL and FR proportional to the rotational angle of the steering wheel 70.

Figure 8:
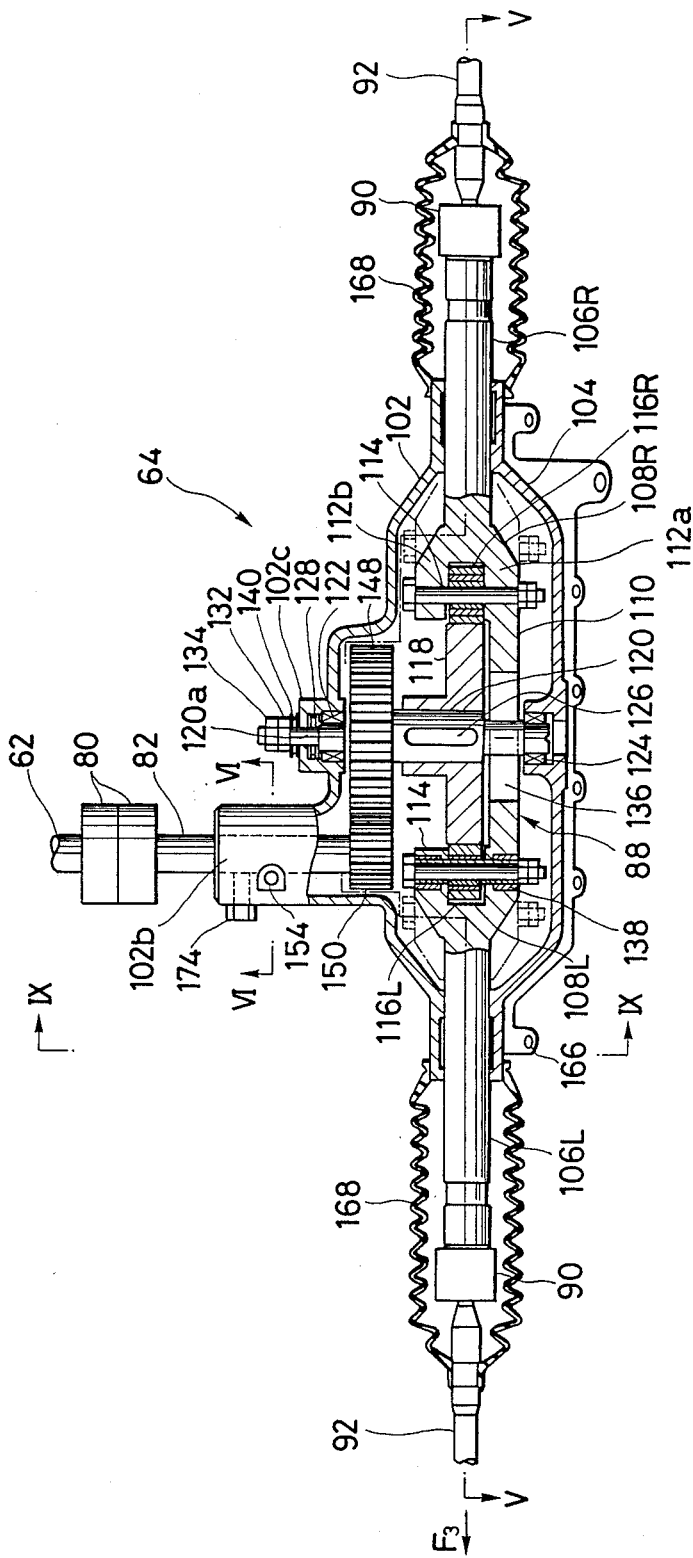

The rear-wheel steering apparatus 64 is disposed slightly behind and above a differential gear device 84 and left and right axle casings 86 between the rear left and right wheels RL and RR to extend along the widthwise direction. A pair of left and right tie rods 92 are coupled to the two end portions of an output shaft 88 (FIGS. 8 and 9) of the rear-wheel steering apparatus 64 through ball joints 90 (FIGS. 8 and 9). The outer end portions of the tie rods 92 are pivotally coupled to brackets 96 of rear side portions of wheel support members 94 of the rear wheels RL and RR through upright pins 98. The wheel support members 94 are pivotally coupled to the outer end portions of the axle casings 86 through pin members extending in a substantially vertical direction. Therefore, when the output shaft 88 of the rear-wheel steering apparatus 64 is driven to the left as indicated by an arrow $F_3$, the rear wheels RL and RR are turned clockwise in FIG. 5, i.e., in the left turn direction. On the other hand, when the output shaft 88 is driven to the right, the rear left and right wheels RL and RR are turned counterclockwise, i.e., in the left turn direction.

The structure of the rear-wheel steering apparatus 64 will be described in detail below with reference to FIGS. 8 to 14.

A hollow housing 100 is constituted by lower and upper housings 102 and 104. A horizontal output shaft 88 extending in the widthwise direction of the vehicle body is disposed in the housing 100 to be movable in the right-and-left direction. The output shaft 88 is constituted by a pair of left and right rod portions 106L and 106R, a pair of left and right Y-shaped roller support portions 108L and 108R formed on the inner end portions of the rod portions 106L and 106R, and a coupling shaft portion 110 for connecting rear arm portions 112a of these roller support portions 108L and 108R and integrally formed on the roller support portions 108L and 108R. Each of the roller support portions 108L and 108R has a pair of front and rear arm portions 112a and 112b. In FIG. 8, a roller 116L is pivotally fitted on a horizontal pivot shaft 114, which extends along the back-and-forth direction and the two ends of which are supported by the front and rear arm portions 112a and 112b of the left roller support portion 108L which is open to the right in FIG. 8. A roller 116R is pivotally fitted on a horizontal pivot shaft 114 which extends in the back-and-forth direction and the two ends of which are supported by the front and rear arm portions 112a and 112b of the right roller support portion 108R open to the left.

An upright planar cam member 118 is disposed between the left and right rollers 116L and 116R. Left and right side portions of the outer surface of the cam member 118 are in contact with the corresponding rollers 116L and 116R. The pair of rod portions 106L and 106R and the pair of rollers 116L and 116R of the output shaft 88, and the cam member 118 are coaxially arranged in line when viewed from the top. The pair of rod portions 106L and 106R and the pair of rollers 116L and 116R of the output shaft 88 and the central portion of the cam member 118 are coaxially arranged in line when viewed from the front side.

A horizontal pivot shaft 120 extending in the back-and-forth direction is fitted in and inserted through the central portion of the cam member 118. The front end portion of the pivot shaft 120 is supported by an axial hole of the lower housing 102 through a radial bearing 122. The rear end portion of the pivot shaft 120 is supported by an axial hole of the upper housing 104 through a radial bearing 124. A key 126 is interposed between the cam member 118 and the pivot shaft 120. The cam member 118 is rotatable about the pivot shaft 120 together with it. A small-diameter shaft portion 120a at the front end portion of the pivot shaft 120 extends forward through a hole in a cap-like projecting portion 102c of the lower housing 102.

Thrust bearings 128 and 130 are mounted on the upper surface and the upper bottom surface of the projecting portion 102c. The outer thrust bearing 130 is held by a nut 132 and a lock nut 134 threadably engaged with the small-diameter shaft portion 120a. The inner thrust bearing 128 is in contact with the annular end face of the pivot shaft 120. Therefore, the pivot shaft 120 is regulated by the pair of thrust bearings 128 and 130 so as not to be moved in the axial direction. The rear end portion of the pivot shaft 120 is inserted through a guide hole 136 elongated in the right-and-left direction and formed in the coupling shaft portion 110. The pivot shaft 120 is in contact with both the upper and lower surface portions of the guide hole 136. Therefore, the output shaft 88 including the coupling shaft portion 110 is movable in the right-and-left direction relative to the pivot shaft 120 but is not relatively movable in the up-and-down direction.

In order to prevent formation of a gap between the outer peripheral surface of the cam member 118 and the pair of rollers 116L and 116L, one of the pair of rollers 116L and 116R (in this embodiment, the left roller 116L) is attached to the roller support portion 108L through a pair of front and rear hard rubber bushings 138.

Figure 11:
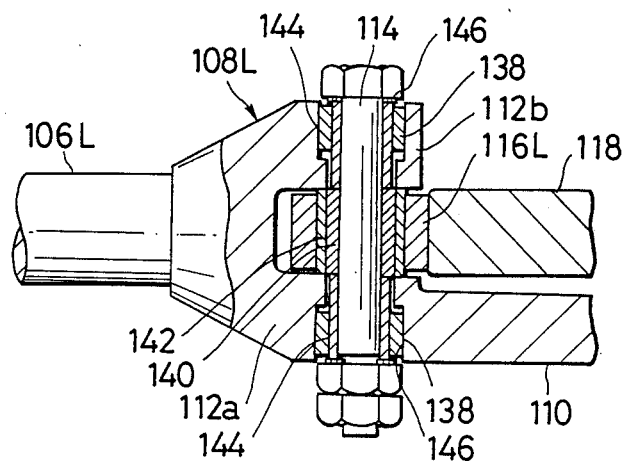

As shown in FIG. 11, the roller 116L is fitted on the pivot shaft 114 through a sleeve 140 fitted around the shaft 114 under pressure and a bearing metal 142 fitted around the sleeve 140. Collars 144 for regulating the position of the sleeve 140 are fitted around the two end portions of the support shaft 114. Annular rubber bushings 138 are mounted in a compressed state in annular spaces between the collars 144 and inner peripheral surfaces 146 of the pivot holes of the arm portions 112a and 112b.

Figure 12:
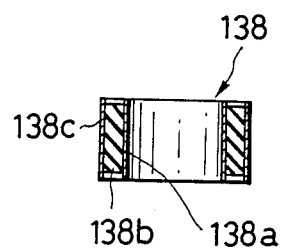

Each rubber bushing 138 has a structure in which, for example, a hard rubber bushing body 138b which is pre-loaded in a compressed state is assembled between a metal inner cylinder 138a and a metal outer cylinder 138c, as shown in FIG. 12. The rubber bushing 138 can withstand a load applied from the rear wheels RL and RR to the rollers 116L and 116R through the tie rods 92 and the output shaft 88.

In order to pivot the cam member 118 in accordance with the turning angle of the front wheels FL and FR, a spur gear 148 is fixed to the pivot shaft 120 in the housing 100. A small-diameter pinion 150 meshed with the spur gear 148 is adjacent to the right lower portion of the spur gear 148. The pinion 150 is fixed to the rear end portion of the input shaft 82. The input shaft 82 extends forward through a boss portion 102b of the lower housing 102. The front end portion of the input shaft 82 is coupled to the rear end portion of the intermediate shaft 62 through a coupling 80 to be pivoted together. The input shaft 82 is rotatably supported by the boss portion 102b. As shown in FIG. 10, a regulating pin 154 is engaged with an annular groove 152 on the outer surface of the input shaft 82, so that the input shaft 82 is regulated not to be moved in the back-and-forth direction.

The speed of the intermediate shaft 62 is reduced at a predetermined speed reduction ratio with respect to the rotation of the steering shaft 72 through the sub rack and the pinion 78. The speed of the spur gear 148 is reduced at a speed reduction ratio of (the diameter of the pinion 150)/(the diameter of the spur gear 148) with respect to the rotation of the intermediate shaft 62.

Therefore, the cam member 118 is pivoted in proportion to the turning angle of the front wheels FL and FR, which is, in turn, proportional to the steering angle of the steering wheel 70. As a result, when the steering wheel 70 is steered in the direction of the arrow $F_1$ in FIG. 5, the cam member 118 is pivoted counterclockwise (in a direction of an arrow $F_4$ in FIG. 9) when viewed from the rear side. When the steering wheel 70 is steered in a direction opposite to the arrow $F_1$, the cam member 118 is pivoted in a direction opposite to the direction of the arrow $F_4$.

The shape of the cam member 118 will be described below.

Figure 14:
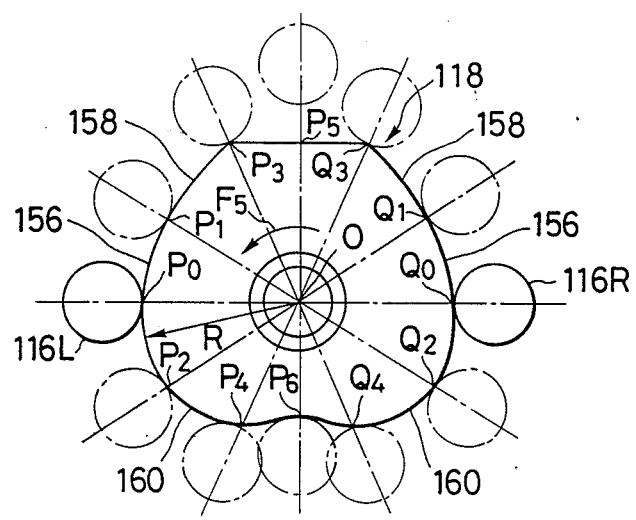

FIG. 14 shows the relative positional relationship between the cam member 118 and the pair of rollers 116L and 116R when viewed from the rear side.

The cam member 118 has a symmetrical shape when viewed from the rear side. When the turning angle of the front wheels FL and FR is zero, the cam member 118 is set in a neutral state, as indicated by a solid line in FIG. 14. In this neutral state, the left roller 116L is in contact with a point $P_0$ and the right roller 116R is in contact with a point $Q_0$. On each of the left and right side portions of the outer peripheral surface of the cam member 118, a first cam surface 156, a second cam surface 158 continuing upward from the upper end of the first cam surface 156, and a third cam surface 160 continuing downward from the lower end of the first cam surface 156 are formed. A range corresponding to the first, second, and third cam surfaces 156, 158, and 160 is defined as a steering range.

The first cam surface 156 functions in cooperation with the opposing first cam surface 156. When the steering wheel 70 is steered counterclockwise or clockwise within a range of 200° or less (corresponding to a turning angle $\frac{1}{F} = 15°$ of the front wheels FL and FR), the first cam surfaces 156 keep the rear wheels RL and RR in the non-turned, i.e., neutral state.

Each first cam surface 156 is part of a cylindrical surface of a radius R having the center 0 of the pivot shaft 120 as the center (i.e., a cylindrical surface consisting of an arc $P_1P_2$), and corresponds to a range in which the steering wheel 70 is steered counterclockwise or clockwise by 200° (i.e., a total of 400°). When the steering wheel 70 is steered counterclockwise by 200°, the cam member 118 is rotated in a direction of an arrow $F_5$, so that the left roller 116L is in contact with a point $P_1$ and the right roller 116R is in contact with a point $Q_2$. On the other hand, when the steering wheel 70 is steered clockwise by 200°, the cam member 118 is rotated in a direction opposite to the arrow $F_5$, so that the left roller 116L is in contact with a point $P_2$ and the right roller 116R is in contact with a point $Q_1$.

The second cam surface 158 functions in cooperation with the opposing third cam surface 160. On the other hand, the third cam surface 160 functions in cooperation with the opposing second cam surface 158. That is, when the steering wheel 70 is steered counterclockwise or clockwise by an angle larger than 200°, in other words, when the turning angle $\frac{1}{F}$ of the front wheels FL and FR exceeds 15°, the second and third cam surfaces 158 and 160 turn the rear wheels RL and RR in a phase opposite to that of the front wheels FL and FR in proportion to an angle of ($\frac{1}{F} - 15°$).

Each second cam surface 158 is a curved surface determined by a curve $P_1P_3$, and a radius from the center 0 is gradually increased from the point $P_1$ toward the point $P_3$.

Each third cam surface 160 is a curved surface determined by a curve $P_2P_4$, and a radius from the center 0 is gradually decreased from the point $P_2$ toward the point $P_4$. A diameter $P_1Q_2 =$ a diameter $P_3Q_4 = 2R$ is set. A diameter from a point between the points $P_1$ and $P_3$ to a corresponding point between the points $Q_2$ and $Q_4$ is also set to be 2R. The same applies to the relationship between the third cam surface 160 of a curve $P_2P_4$ and the second cam surface 158 of a curve $Q_1Q_3$.

As a result, when the left roller 116L is in contact with the point $P_3$, the right roller 116R is in contact with the point $Q_4$. When the left roller 116L is in contact with the point $P_4$, the right roller 116R is in contact with the point $Q_3$. Therefore, as long as the cam member 118 is rotated within the steering range, the left and right rollers 116L and 116R are always in contact with the outer peripheral surface of the cam member 118. Of the steering range, a portion near the point $P_3$ and a portion near the point $P_4$ are rarely used in practice.

Figure 15:
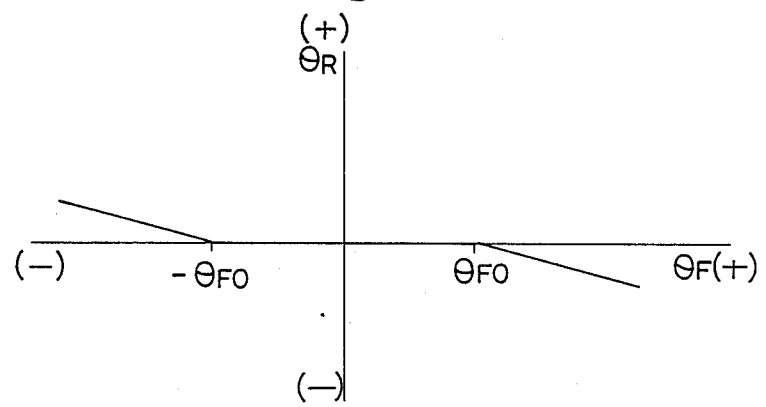
Figure 19:
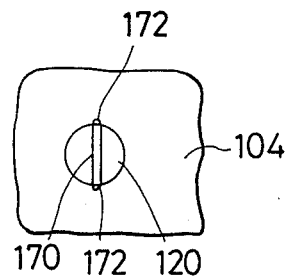

FIG. 15 shows the characteristic of the rear-wheel steering apparatus 64 determined by the cam member 118, and the like while the turning angle $\theta_F$ of the front wheels FL and FR is plotted along the abscissa, and a turning angle $\theta_R$ of the rear wheels RR and RL is plotted along the ordinate. In this case, $\theta_{OF}$ is set to be, e.g., $\theta_{FO} = 15°$.

In order to allow easy assembly of the cam member 118 when it is assembled between the pair of left and right rollers 116L and 116R, the diameter of the cam member 118 other than the outer peripheral surface within the steering range is set to be smaller than 2R. A portion between the points $P_3$ and $Q_3$ is linearly formed to be parallel to the diameter $P_0Q_0$. A diameter $P_5P_6$ is set to be considerably smaller than 2R. Diameters between the points $P_3$ and $P_5$ and between the points $Q_4$ and $P_6$ are set to be considerably smaller than 2R. In the neutral state illustrated in FIG. 14, the height of the cam member 118 is set to be considerably smaller than 2R.

Figure 13:
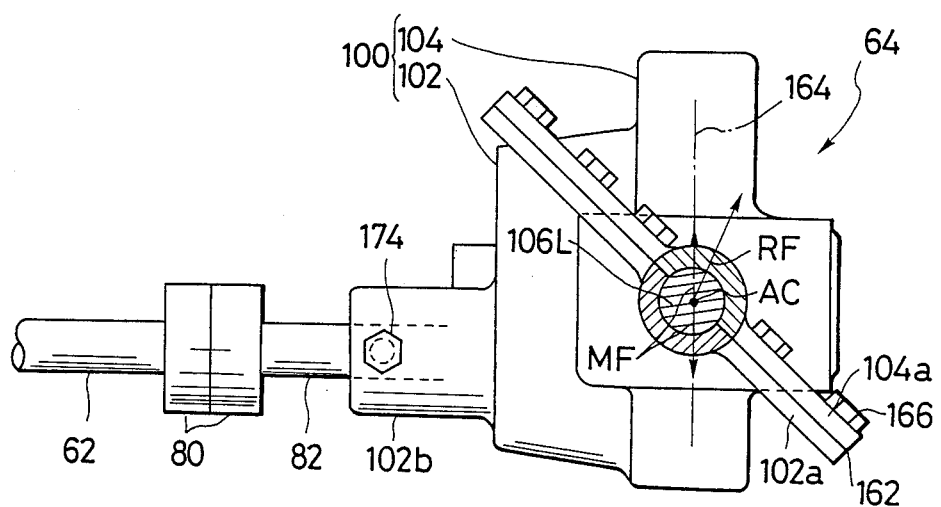

The structure of the housing 100 will be described below with reference to FIG. 13.

The housing 100 is formed into a hollow shape by the lower and upper housings 102 and 104 divided by a division surface 162 so as to assemble the output shaft 88, the cam member 118, the spur gear 148, the pinion 150, and the like in the housing 100. In the housing 100 of this embodiment, the direction of the division surface 162 is designed as follows.

During travel of a vehicle, especially, when the vehicle makes a turn at a corner, an axial force of several hundreds of kg acts from the rear wheel RL or RR to the corresponding tie rod 92, and is transmitted from the tie rod 92 to the end portion of the output shaft 88. Since each tie rod 92 is tilted forward and downward with respect to the output shaft 88, a partial force RF of the axial force from the output shaft 88 acts on the housing 100 fixed to the vehicle body in a direction shown in FIG. 13.

A rotational moment acts on the cam member 118 through the roller 116L or 116R by the axial force transmitted from the tie rod 92 to the output shaft 88. A pair of counterforces MF act from the output shaft 88 on the housing 100 in a vertical plane 164 shown in FIG. 13. In order to assemble the above-mentioned components in the housing 100, the division surface 162 is normally directed in the vertical direction but this is not preferable in consideration of the partial force RF and the counterforces MF. In this embodiment, the division surface 162 of the housing 100 is set to be a tilt surface including an axial center AC of the output shaft 88, especially, a tilt surface which is tilted upward toward the front side at about 45° with respect to the vertical plane to cross the directions of the partial force RF and the counterforces MF.

Flange portions 102a and 104a are respectively formed on the outer peripheral edges of the lower and upper housings 102 and 104 along the division surface 162. These flange portions 102a and 104a are fixed by a plurality of bolts 166. Since the division surface 162 is formed as described above, the above-mentioned components can be easily assembled and a sufficient mechanical strength against the partial force RF and the counterforces MF can be assured by the relatively small flange portions 102a and 104a and the bolts 166. Outer end portions of the rod portions 106L and 106R and inner end portions of the tie rods 92 are covered with bellows members 168 made of rubber.

The rear-wheel steering operation of the rear-wheel steering apparatus 64 with the above arrangement will be described below.

As has been described above, when the steering wheel is steered in the direction of the arrow $F_1$ in FIG. 5, the cam member 118 is rotated in the direction of the arrow $F_5$ in FIG. 14 in accordance with the turning angle of the front wheels FL and FR. On the other hand, when the steering wheel 70 is turned in a direction opposite to the arrow $F_1$, the cam member 118 is also rotated in a direction opposite to the arrow $F_5$.

When the turning angle of the front wheels FL and FR is smaller than 15° in the left or right turn direction, the rollers 116L and 116R roll along the first cam surfaces 156 having an equal radius. As a result, the rollers 116L and 116R are located at symmetrical positions with respect to the center 0, and the rear wheels RL and RR are not turned to maintain the neutral state.

When the front wheels FL and FR are turned in the left turn direction at an angle equal to or larger than 15°, the roller 116L rolls along the left second cam surface 158, and the roller 116R rolls along the right third cam surface 160. As a result, since the radius from the center 0 to the roller 116L becomes larger than the radius from the center 0 to the roller 116R, the output shaft 88 is moved to the left, and the pair of rear wheels RL and RR are turned in the left turn direction (clockwise in FIG. 5) through the pair of tie rods 92.

When the front wheels FL and FR are turned in the right turn direction at an angle equal to or larger than 15°, the roller 116L rolls along the left third cam surface 160, and the roller 116R rolls along the right second cam surface 158. As a result, since the radius from the center 0 to the roller 116L becomes smaller than the radius from the center 0 to the roller 116R, the output shaft 88 is moved to the right, and the pair of rear wheels RL and RR are turned in the right turn direction (counterclockwise in FIG. 5) through the pair of tie rods 92.

In this manner, when the steering wheel 70 is steered counterclockwise or clockwise by 200° or more to turn the front wheels FL and FR at 15° or more, the rear wheels RL and RR are turned in a phase opposite to that of the front wheels FL and FR.

Although the turning angle $\theta_R$ of the rear wheels RL and RR is proportional to $(\theta_F - 15°)$, it is set to be a maximum of about 10°.

During travel of the vehicle, a large axial force acts from the tie rods 92 to the output shaft 88, as described above. The pair of rod portions 106L and 106R and the pair of rollers 116L and 116R of the output shaft 88 and the cam member 118 are coaxially arranged. As a result, the axial force is mainly transmitted in the form of a compression force among components, and no large bending moment will act on any component. The pivot shaft 114 is supported at its two ends. Therefore, no large bending moment acts on the pivot shaft 114, either. Furthermore, since the rollers 116L and 116R are in contact with the left and right end portions of the cam member 118, almost no force acts from the cam member 118 on the pivot shaft 120.

Therefore, various components such as the output shaft 88, the cam member 118, the pivot shaft 120, and the like can be rendered compact as much as possible, thus realizing a compact, lightweight, and simple rear-wheel steering apparatus. In addition, since the output shaft 88 is a single member, the rear left and right wheels RL and RR can be satisfactorily synchronously turned.

The rubber bushings 138 are interposed between the roller 116L and the roller support portion 108L but not interposed between the roller 116R and the roller support portion 108R. If the rubber bushings 138 are provided to both the rollers 116L and 116R, when the rubber bushings 138 are degraded after a use for a long term, the elastic forces of the rubber bushings 138 become different and the output shaft 88 is displaced slightly to the left or right with respect to the cam member 118. Thus, the alignment between the rear wheels RL and RR in the neutral state is disturbed.

In this embodiment, however, since the rubber bushings 138 are provided to one roller 116L, if the elastic force of the rubber bushings 138 is varied, the positional relationship between the cam member 118 and the output shaft 88 is kept constant through the roller 116R without the rubber bushings 138. In this manner, the alignment between the rear wheels RL and RR in the neutral state will not be disturbed.

Since the rubber bushings 138 are assembled in a preloaded state, it is very difficult to assemble the cam member 118 between the left and right rollers 116L and 116R. In order to facilitate assembly of the cam member 118, the diameter of the cam member 118 excluding the steering range (e.g., the diameter $P_5P_6$ in FIG. 14) is set to be considerably smaller than 2R.

Figure 16:
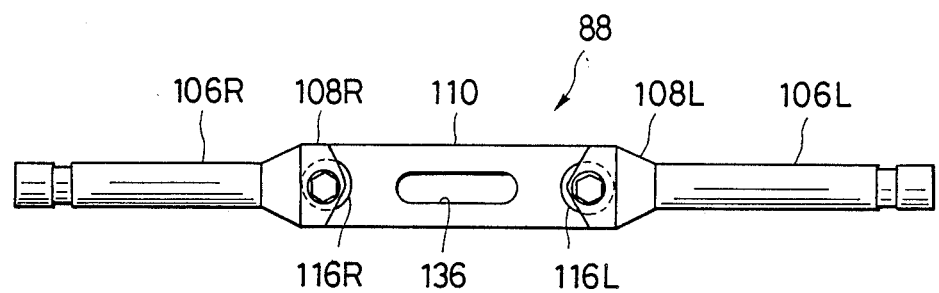
Figure 17:
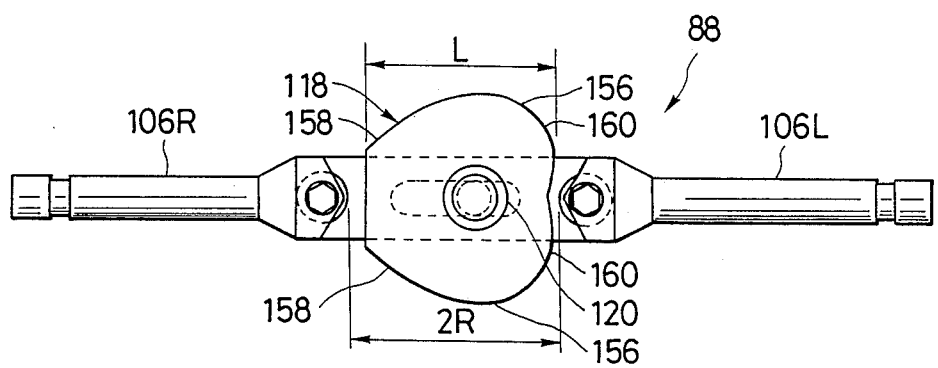
Figure 18:
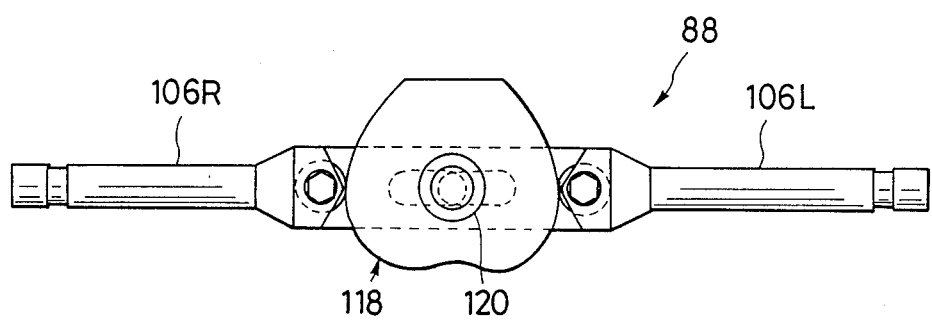

When the cam member 118 assembled with the pivot shaft 120 is assembled to the output shaft 88 in advance outside the housing 100, the cam member 118 is rotated through 90° from the neutral state and the rear end portion of the pivot shaft 120 is inserted in the guide hole 136, as shown in the front views of FIGS. 16 to 18. In this case, since a size L is sufficiently smaller than 2R, the cam member 118 can be easily assembled, as shown in FIG. 17. When the cam member 118 is then pivoted clockwise in FIG. 17 together with the pivot shaft 120, the roller 116L rolls along the third and first cam surfaces 160 and 156, and the roller 116R rolls along the second and first cam surfaces 158 and 156. In this manner, the cam member 118 can be very easily assembled in a state shown in FIG. 18.

In the assembly order, after the spur gear 148 and the bearings 122, 124, 128, and 130 are assembled to the pivot shaft 120, the assembly of these components and the assembly of the pinion 150 and the input shaft 82 are assembled to the lower housing 102. Then, the upper housing 104 is assembled to the lower housing 102. In this case, upon assembly of a vehicle, the cam member 118 must be maintained in the neutral state in FIGS. 9 and 14 until the alignment between the front wheels FL and FR and that between the rear wheels RL and RR are set. When the unit of the rear-wheel steering apparatus 64 is assembled as described above, an upright groove 170 formed in the rear end of the support shaft 120 is aligned with a pair of upper and lower marks 172 of the upper housing 104 to set the cam member 118 in the neutral state, and the input shaft 82 is temporarily fixed by a bolt 174 of the boss portion 102b of the lower housing 102. After the vehicle is assembled and the alignment between the front wheels FL and FR and that between the rear wheels RL and RR are set, the bolt 174 is removed.

The pair of thrust bearings 128 and 130 are provided to the front end portion of the pivot shaft 120 for supporting the cam member 118. The pivot shaft 120 is axially supported by the thrust bearings 128 and 130. As a result, since the coupling shaft portion 110 of the output shaft 88 is asymmetrical with the roller support portions 108L and 108R in the back-and-forth direction, if an external axial force acts on the pivot shaft 120, no large rotational sliding resistance will be produced between the pivot shaft 120 and the housing 100. The thrust bearing 130 may be provided to the rear end portion of the pivot shaft 120.

In the housing 100, since the division surface 162 of the lower and upper housings 102 and 104 is formed into a tilt surface which is tilted upward toward the front side at 45° with respect to the vertical plane, it is advantageous in terms of a coupling strength for coupling the lower and upper housings 102 and 104, and no problem is encountered when various components are assembled in the housing 100.

Figure 20:
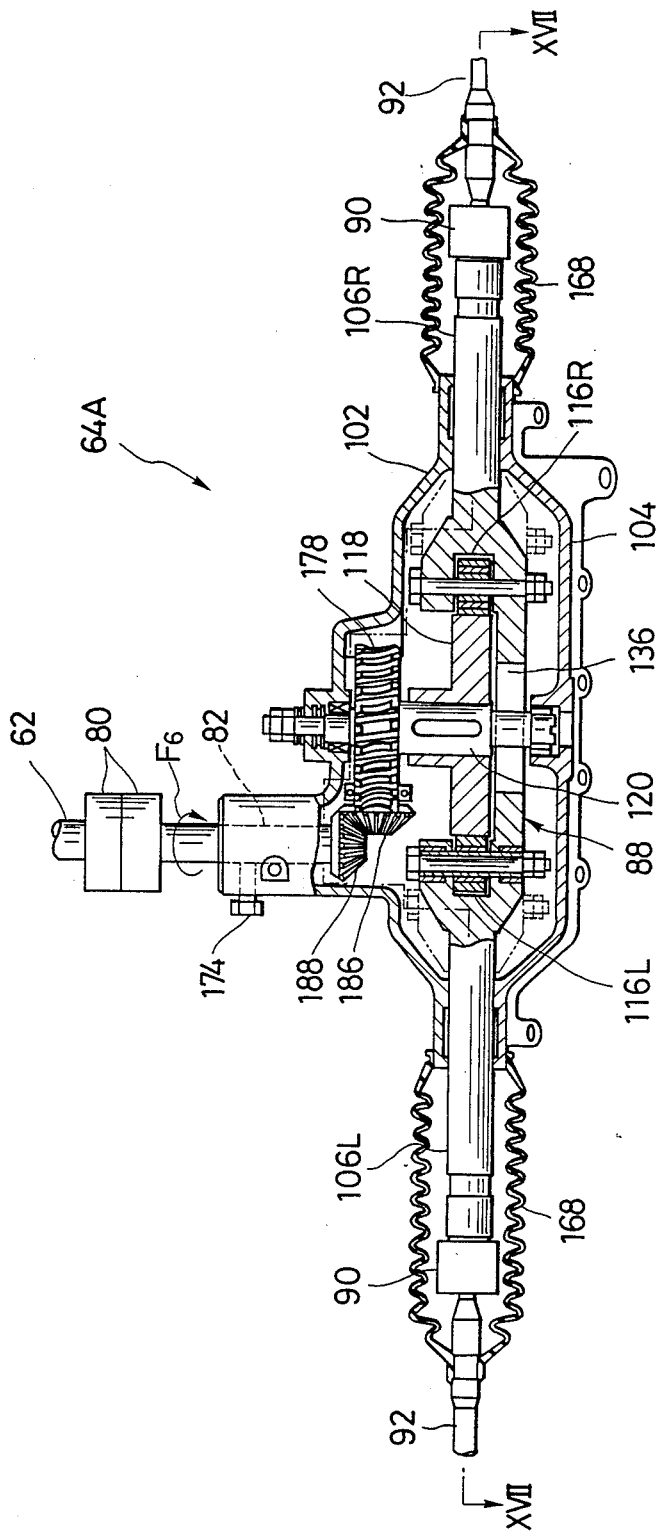
FIGS. 20 and 21 are respectively a cross-sectional view and a longitudinal sectional view of a third embodiment of a rear-wheel steering apparatus according to the present invention.

An arrangement of a third embodiment of a rear-wheel steering apparatus for a vehicle according to the present invention will now be described with reference to FIGS. 20 and 21.

In the second embodiment described above, the four-wheel steering apparatus comprises the rear-wheel steering apparatus 64. The third embodiment employs a rear-wheel steering apparatus 64A shown in FIGS. 20 and 21 in place of the rear-wheel steering apparatus 64. In the following description, the same reference numerals in this embodiment denote the same or similar parts as in the rear-wheel steering apparatus 64 described above, and a detailed description thereof will be omitted.

In this rear-wheel steering apparatus 64A, a worm gear mechanism 176 is arranged to transmit rotation of an input shaft 82 to a pivot shaft 120 unlike the rear-wheel steering apparatus 64 in the second embodiment.

More specifically, in the worm gear mechanism 176, a worm wheel 178 is fixed to the front portion of the pivot shaft 120 in a housing 100. A small-diameter worm gear 180 meshed with the lower portion of the worm wheel 178 and extending in the right-and-left direction is disposed under the worm wheel 178. Portions near the left end and the right end portion of the worm gear 180 are supported by pivot support portions 182 and 184 of a lower housing 102 through bearing metals. A small-diameter bevel gear 186 is fixed to the left end portion of the worm gear 180. A gear 188 meshed with the bevel gear 186 is fixed to the rear end portion of the input shaft 82. The speed reduction ratio of this worm gear mechanism 176 is set to be the same as that of the reduction gear mechanism constituted by the spur gear 148 and the pinion 150 in the second embodiment.

Figure 21:
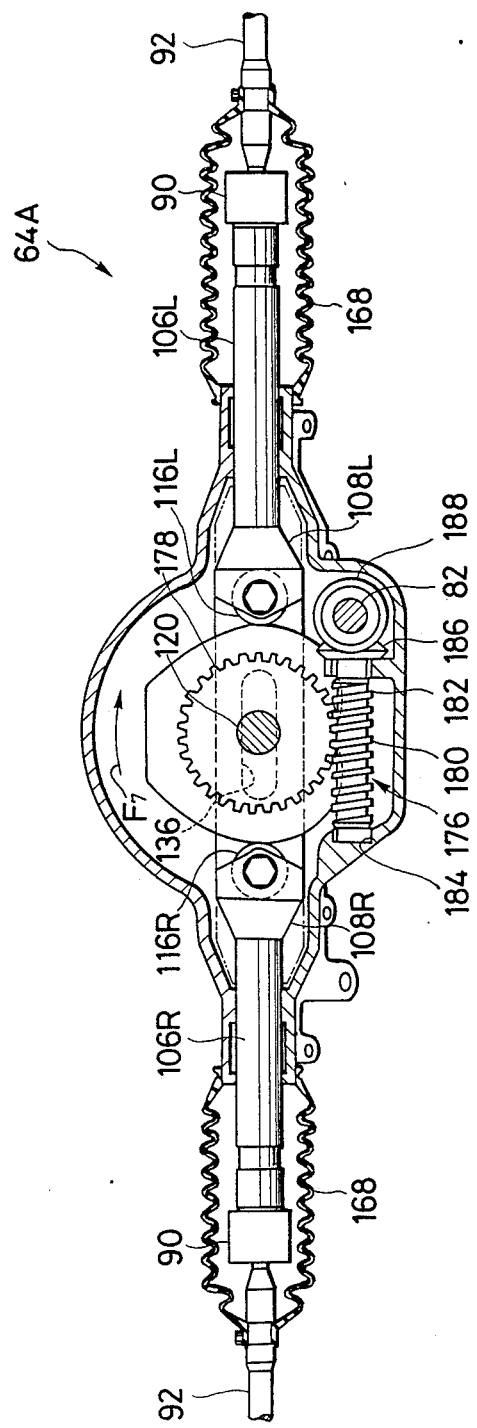

In the third embodiment with the above arrangement, when a steering wheel 70 is steered in the direction of the arrow $F_1$ in FIG. 5, the input shaft is rotated in a direction of an arrow $F_6$, and a cam member 118 is rotated in a direction of an arrow $F_7$ in FIG. 21, i.e., in the direction of the arrow $F_5$ in FIG. 14. When the steering wheel 70 is rotated in a direction opposite to the arrow $F_1$, the cam member 118 is rotated in the direction opposite to the arrow $F_7$.

Therefore, the operation for turning the rear wheels RL and RR is the same as that of the rear-wheel steering apparatus 64 in the second embodiment, and a detailed description thereof will be omitted.

The operation of the worm gear mechanism 176 will be described below. During travel of the vehicle, especially, when the vehicle makes a turn at a corner, a large external force acts from one tie rod 92 to the output shaft 88 and a roller 116L or 116R, and a rotational moment acts on the cam member 118. The rotational moment is cut off by the worm gear mechanism 176, and is not transmitted to the input shaft 82. In this manner, the steering force of the steering wheel 70 can be prevented from being increased.

In the first to third embodiments, the cam member 44 or 118 is arranged so that when the front wheels are turned at an angle smaller than 15°, the rear wheels RL and RR are maintained in a non-steered position, i.e., a neutral position. However, the present invention is not limited to the cam member of this structure. As shown in a fourth embodiment to be described below with reference to FIGS. 22 to 24, when the front wheels FL and FR are turned at an angle smaller than about 15°, the rear wheels RL and RR may be turned to be in-phase with the front wheels.

The fourth embodiment employs a cam member having a shape different from those of the cam members 44 and 118 in the first to third embodiments, and other arrangements are the same as those in the first to third embodiments. In the following description, the same reference numerals denote the same parts as in the second embodiment described above, and a detailed description thereof will be omitted.

Figure 22:
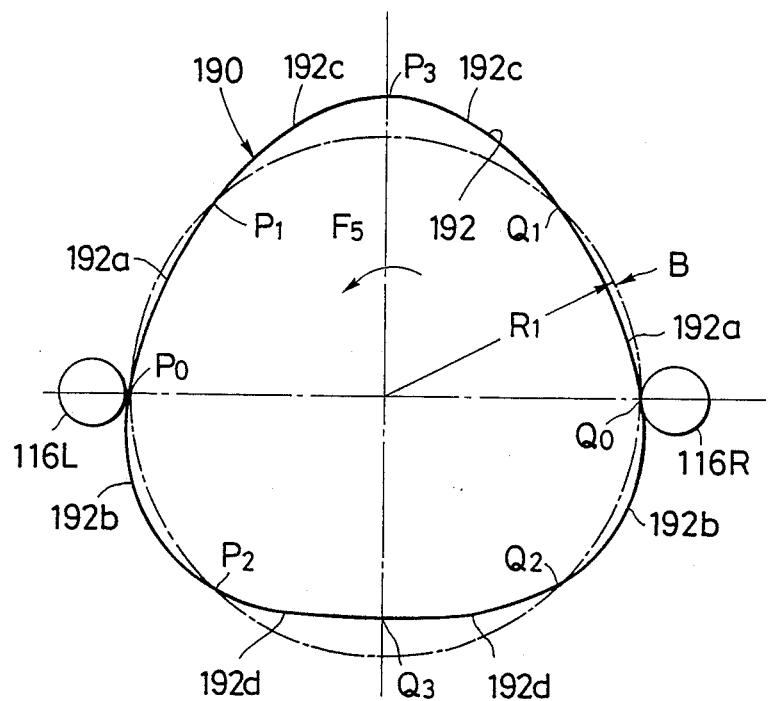

A cam member 190 in the fourth embodiment is arranged as shown in FIG. 22. More specifically, the outer peripheral surface of the cam member 190 comprises a cam surface 192 which locally protrudes or subsides from a basic circle B which has a rotational center as its central point and a predetermined radius R.

The cam member 190 has a symmetrical shape as in the second embodiment when viewed from the rear side. As shown in FIG. 23A, when a turning angle of front wheels FL and FR is zero, the cam member 190 is in a neutral state, as indicated by a bold line in FIG. 22. In this neutral state, a left roller 116L is in contact with a point $P_0$, and a right roller 116R is in contact with a point $Q_0$. A distance between the center 0 and each of these points $P_0$ and $Q_0$ is set to be R. More specifically, at these points $P_0$ and $Q_0$, the outer peripheral surface crosses the basic circle.

Paying attention to the left or right half portion in FIG. 22, the cam surface 192 is constituted by a first cam surface 192a extending upward from the point $P_0$ or $Q_0$ on the outer peripheral surface of the cam member 190 as a starting point, a second cam surface 192b extending downward from the point $P_0$ or $Q_0$, a third cam surface 192c continuing upward from the upper end of the first cam surface 192a, and a fourth cam surface 192d continuing downward from the lower end of the second cam surface 192b.

The first cam surface 192a functions in cooperation with the opposing second cam surface 192b. The second cam surface 192b functions in cooperation with the opposing first cam surface 192a. As shown in FIG. 23B, when the steering wheel 70 is steered counterclockwise or clockwise within a range of 200° or less (corresponding to a turning angle $\theta_F=15°$ of the front wheels FL and FR), the first cam surface 192a subsides from the basic circle B and the second cam surface 192b protrudes from the basic circle B, so that the rear wheels RL and RR are turned to be in-phase with the front wheels.

The first and second cam surfaces 192a and 192b extend in correspondence with a range in which the steering wheel 70 is steered counterclockwise or clockwise by 200° (a total of 400°) when they are combined. When the steering wheel 70 is steered counterclockwise by 200°, the cam member 190 is rotated in a direction of an arrow $F_5$, so that the left roller 116L is in contact with a point $P_1$, and the right roller 116R is in contact with a point $Q_2$. On the other hand, when the steering wheel 70 is steered clockwise at 200°, the cam member 190 is rotated in a direction opposite to the arrow $F_5$, so that the left roller 116L is in contact with a point $P_2$, and the right roller 116R is in contact with a point $Q_1$.

The cam surface as the outer peripheral surface crosses the basic circle at the points $P_1$, $P_2$, $Q_1$, and $Q_2$. As a result, as shown in FIG. 23C, when the steering wheel 70 is steered counterclockwise or clockwise by 200° (corresponding to a turning angle $\theta_F = 15°$ of the front wheels FL and FR), the rear wheels RL and RR are returned to and held in a neutral state.

The third cam surface 192c functions in cooperation with the opposing fourth cam surface 192d. The fourth cam surface 192d functions in cooperation with the opposing third cam surface 192c. As shown in FIG. 23D, when the steering wheel 70 is steered counterclockwise or clockwise at an angle larger than 200°, in other words, when the turning angle $\theta_F$ of the front wheels FL and FR exceeds 15°, the third cam surface 192c protrudes from the basic circle B and the fourth cam surface 192d subsides from the basic circle B, so that the rear wheels RL and RR are turned in a phase opposite to that of the front wheels FL and FR in proportion to an angle of $(\theta_F-15°)$.

Note that the upper ends of the left and right third cam surfaces 192c are continuous with each other at a point $P_3$ on a symmetrical line, and lower ends of the left and right fourth cam surfaces 192d are continuous with each other at a point $Q_3$ on the line of symmetry. As a result, as long as the cam member 190 is rotated within the steering range, the left and right rollers 116L and 116R are kept in contact with the cam surface 192 as the outer peripheral surface of the cam member 190. As shown in FIG. 23D, when the front wheels FL and FR are turned by a maximum angle, the rollers 116L and 116R are in rolling contact with positions immediately before points $P_3$ and $Q_3$.

Since the cam member 190 of the fourth embodiment is arranged as described above, unlike the first to third embodiments, the rear wheels RL and RR are turned to be in-phase with the front wheels FL and FR in a turning operation by a turning angle of up to 15° of the front wheels FL and FR, and a slight position change operation of a vehicle such as lane change, or the like can be very stably attained. On the other hand, in a turning operation of 15° or more of the front wheels FL and FR, the rear wheels RL and RR are turned in a phase opposite to that of the front wheels FL and FR like in the first to third embodiments, and the same effect as described above can be obtained.

In the fourth embodiment, arrangements other than the cam member 190 are the same as those in the second embodiment but may be the same as those of the first embodiment.

As many apparently widely different embodiments of the present invention can be made without departing from the spirit and scope thereof, it is to be understood that the invention is not limited to the specific embodiments thereof except as defined in the appended claims.

What is claimed is:

1. In a rear-wheel steering apparatus for a vehicle, comprising:

a pair of tie rods, respectively connected to a pair of rear wheels, for turning the corresponding rear wheels in a right-and-left direction of the vehicle; and rear-wheel steering means, connected to said tie rods, for displacing the corresponding tie rods in the right-and-left direction of the vehicle, the improvement in which said rear-wheel steering means includes:

a casing;

an output shaft both ends of which are respectively connected to said pair of tie rods and supported on said casing to be displaceable in the right-and-left direction of the vehicle;

a cam member which is supported to be rotatable about an axis extending to be perpendicular to an axial direction of said output shaft and on an outer peripheral surface of which a cam profile is formed;

a pair of roller members which are provided to said output shaft, disposed at two sides of said cam member to sandwich said cam member therebetween, and in rolling contact with opposing portions of the outer peripheral surface of said cam member; and an input shaft for rotating said cam member.

2. The apparatus according to claim 1, wherein said pair of roller members are axially supported to said output shaft to be rotatable about an axis parallel to a rotational axis of said cam member.

3. The apparatus according to claim 1, which further comprises:
a support portion for axially supporting said cam member to be rotatable relative to said casing.

4. The apparatus according to claim 3, wherein said support portion of said cam member includes an axis which extends along a back-and-forth direction of the vehicle.

5. The apparatus according to claim 2, wherein said pair of roller members are arranged so that an axis for connecting the centers thereof passes substantially the center of said output shaft.

6. The apparatus according to claim 5, wherein said cam member includes a rotational center which is substantially located at a central axis of said output shaft.

7. The apparatus according to claim 1, wherein said cam member includes a rotational axis which extends along a back-and-forth direction of the vehicle, and
said pair of roller members are set at substantially the same level on two sides of said cam member.

8. The apparatus according to claim 1, wherein said input shaft is rotated in accordance with a turning operation of front wheels.

9. The apparatus according to claim 1, which further comprises:
an elastic body interposed between each of said roller members and said output shaft.

10. The apparatus according to claim 9, wherein said roller members are axially and rotatably supported by pivot shafts attached to said output shaft, and
said elastic body comprises a rubber bushing disposed between an outer peripheral surface of a support portion of said pivot shaft and an inner peripheral surface of a through hole which is formed in said output shaft to receive the pivot shaft.

11. The apparatus according to claim 1, wherein said casing is constituted by combining lower and upper casing halves through a division surface, and
the division surface is a tilt surface which includes an extending axis of said output shaft, and is tilted upward toward a front side at a predetermined angle with respect to a vertical plane.

12. The apparatus according to claim 11, wherein said lower and upper casing halves are aligned by the division surface and are fixed to each other through bolts.

13. The apparatus according to claim 1, which further comprises:
a small-diameter pinion fixed to an end portion of said input shaft;
a rotational pivot shaft fixed to said cam member to be aligned with a rotational axis of said cam member; and
a spur gear coaxially fixed to an end portion of said rotational pivot shaft and meshed with said pinion.

14. The apparatus according to claim 13, wherein said rotational pivot shaft is axially and rotatably supported on said casing.

15. The apparatus according to claim 1, which further comprises:
a first bevel gear fixed to an end portion of said input shaft;
a rotational pivot shaft fixed to said cam member to be aligned with a rotational axis of said cam member;
a worm wheel coaxially fixed to an end portion of said rotational pivot shaft;
a worm gear which is axially supported to be rotatable about an axis extending along a direction perpendicular to the rotational axis of said cam member and is meshed with said worm wheel; and
a second bevel gear coaxially fixed to an end portion of said worm gear and meshed with said first bevel gear.

16. The apparatus according to claim 15, wherein said rotational pivot shaft and said worm gear are rotatably and axially supported on said casing.

17. The apparatus according to claim 1, wherein said cam member comprises, on an outer peripheral surface thereof, a cam surface for regulating said rear wheels in a neutral state in a predetermined rotational angle range defining a small turning range of front wheels and for turning said rear wheels in a phase opposite to said front wheels in a rotational angle range exceeding the predetermined rotational angle range.

18. The apparatus according to claim 17, wherein said cam surface is formed such that said pair of roller members are simultaneously in rolling contact with said cam surface over the entire outer peripheral surface.

19. The apparatus according to claim 17, wherein said cam surface is formed such that at least one of said pair of roller members is separated from said cam surface at a predetermined portion.

20. The apparatus according to claim 19, wherein the predetermined portion where the roller member is separated is formed at a position defining a portion exceeding the turning range of the front wheels.

21. The apparatus according to claim 1, wherein said cam member comprises, on an outer peripheral surface thereof, a cam surface for turning said rear wheels to be in-phase with front wheels in a predetermined rotational angle range defining a small turning range of the front wheels, and for turning said rear wheels in a phase opposite to said front wheels in a rotational angle range exceeding the predetermined rotational angle range.

* * * * *

UNITED STATES PATENT AND TRADEMARK OFFICE
CERTIFICATE OF CORRECTION

PATENT NO. : 4,949,984

DATED : August 21, 1990

INVENTOR(S) : Hiroki UEMURA, Katsuhiro TOKUMARU, Ayumu DOI

It is certified that error appears in the above-identified patent and that said Letters Patent is hereby corrected as shown below:

Col. 11, line 66, "$\frac{1}{4}F$" should be --$\theta_F$--;

Col. 12, line 22, "$\frac{1}{4}F$" should be --$\theta_F$--;

line 26, "$\frac{1}{4}F$" should be --$\theta_F$--; and line 56, "$\theta_{OF}$" should be --$\theta_{FO}$--.

Signed and Sealed this

Fourth Day of February, 1992

Attest:

HARRY F. MANBECK, JR.

Attesting Officer

Commissioner of Patents and Trademarks